(12) United States Patent
Hong

(10) Patent No.: US 12,713,100 B2
(45) Date of Patent: Aug. 18, 2026

(54) DISPLAY DEVICE AND DISPLAY DEVICE CONTROL METHOD

(71) Applicant: LG ELECTRONICS INC., Seoul (KR)

(72) Inventor: Kiseok Hong, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

(21) Appl. No.: 18/871,776

(22) PCT Filed: Jun. 16, 2022

(86) PCT No.: PCT/KR2022/008527
§ 371 (c)(1),
(2) Date: Dec. 4, 2024

(87) PCT Pub. No.: WO2023/243746
PCT Pub. Date: Dec. 21, 2023

(65) Prior Publication Data

US 2025/0373902 A1 Dec. 4, 2025

(51) Int. Cl.
*H04N 21/482* (2011.01)
*H04N 21/41* (2011.01)
*H04N 21/422* (2011.01)

(52) U.S. Cl.
CPC ..... *H04N 21/4825* (2013.01); *H04N 21/4126* (2013.01); *H04N 21/42203* (2013.01)

(58) Field of Classification Search
CPC ........... H04N 21/4825; H04N 21/4126; H04N 21/42203
See application file for complete search history.

(56) References Cited

U.S. PATENT DOCUMENTS 9,165,144 B1 * 10/2015 Goldstein ............... G06F 21/60
2015/0185964 A1 * 7/2015 Stout ....................... G06F 3/167 715/716

(Continued)

FOREIGN PATENT DOCUMENTS

KR 10-0792399 1/2008
KR 10-2008-0017692 2/2008

(Continued)

OTHER PUBLICATIONS

PCT International Application No. PCT/KR2022/008527, Written Opinion and International Search Report dated Mar. 13, 2023, 9 pages.

(Continued)

*Primary Examiner* — Alazar Tilahun
(74) *Attorney, Agent, or Firm* — LEE, HONG, DEGERMAN, KANG & WAIMEY

(57) ABSTRACT

Provided in one embodiment of the present disclosure is a display device comprising: a memory; an interface unit for communicating with an external device; a display for outputting content; and a control unit for controlling a communication unit and the display, wherein the control unit detects the occurrence of an event while the content is being output, stores the point in time at which the event is detected, outputs an event occurrence list in response to receiving a first control signal, and plays back first content of a first time point on the basis of a second control signal for selecting the first event included in the event occurrence list.

10 Claims, 8 Drawing Sheets

(56) References Cited

U.S. PATENT DOCUMENTS

| | | | | |
|---|---|---|---|---|
| 2016/0198229 | A1* | 7/2016 | Keipert | H04N 21/47217 725/12 |
| 2020/0057607 | A1 | 2/2020 | Jeong | |
| 2022/0167049 | A1* | 5/2022 | Carbune | H04N 21/47202 |

FOREIGN PATENT DOCUMENTS

| | | |
|---|---|---|
| KR | 10-2019-0096852 | 8/2019 |
| KR | 10-2020-0052804 | 5/2020 |
| KR | 10-2020-0058959 | 5/2020 |

OTHER PUBLICATIONS

European Patent Office Application Serial No. 22946952.3, Search Report dated Mar. 31, 2025, 9 pages.

* cited by examiner

DISPLAY DEVICE AND DISPLAY DEVICE CONTROL METHOD

CROSS-REFERENCE TO RELATED APPLICATION(S)

This application is the National Stage filing under 35 U.S.C. 371 of International Application No. PCT/KR2022/008527, filed on Jun. 16, 2022, the contents of which is hereby incorporated by reference herein in its entirety.

TECHNICAL FIELD

The present disclosure relates to a display device and method of controlling the same.

BACKGROUND ART

With the increasing development of information society, the demand for display devices is also increasing in various forms. In response to this trend, various display devices, for example, Liquid Crystal Display (LCD), Field Emission Display (FED), Plasma Display Panel (PDP), an electroluminescent device, etc. have recently been developed.

A liquid crystal panel of the LCD may include a liquid crystal layer, may further include a thin film transistor (TFT) substrate and a color filter substrate that are arranged to face each other on the basis of the liquid crystal panel interposed therebetween, and may display an image using light provided from a backlight unit.

As an example of an electroluminescent device, active-matrix-type organic light emitting display (OLED) devices are commercially available on the market and widely used throughout the world. Since the OLED device is a self-emitting device, the OLED device has no backlight and is advantageous in terms of a response speed and a viewing angle as compared to the LCD, so that the OLED devices are attracting attention as next-generation displays.

However, if noise occurs while watching an image on a display device, there is a problem that it is difficult for a user to see a missed part again due to the noise.

In particular, according to the prior art patent, Registered Patent No. 10-0720575 (television set of switching from a voice mode to a text mode depending on ambient noise and control method thereof), disclosed is a configuration of displaying a subtitle signal only on a display device by blocking or muting a currently provided audio signal if the intensity of noise exceeds a preset prescribed reference value, which is not a solution to the above problem.

DISCLOSURE

Technical Tasks

One technical task of the present disclosure is to provide a display device and method of controlling the same in order to solve the above problem.

Technical Solutions

In one technical aspect of the present disclosure, provided is a display device, including a memory, an interface unit communicating with an external device, a display outputting a content, and a controller configured to control the communication unit and the display.

The controller may detect an occurrence of an event in a state of outputting the content.

The controller may store a timing point of detecting the event, output an event occurrence list in response to receiving a first control signal, and play a first timing point of a first content based on a second control signal for selecting a first event included in the event occurrence list.

The event may be a noise greater than or equal to a first decibel.

The external device may be an AI speaker and the controller may detect the noise through the AI speaker.

The external device may be a remote controller including a microphone and the controller may detect the noise through the microphone.

The external device may be a mobile terminal and the event may include a case that the mobile terminal is in use.

The display device may further include a camera, and the event may include a case that a user is not detected through the camera.

The event occurrence may include the first timing point and the first content information.

Based on receiving a third control signal, the controller may play a second timing point of a content related to a most recently occurring event.

The first control signal may be a signal for selecting a physical button included in a remote controller.

Based on the content being a content received through a broadcast reception unit, the controller may store the content in the memory in response detecting the event.

In another technical aspect of the present disclosure, provided is a method of controlling a display device, the method including detecting an event in a state that a content is being outputted, storing a timing point of detecting the event, outputting an event occurrence list in response to receiving a first control signal, and playing a first timing point of a first content based on a second control signal for selecting a first event included in the event occurrence list.

Advantageous Effects

According to an embodiment of the present disclosure, there is an advantage in that a missed part due to noise may be easily viewed again.

Effects that may be obtained from the present disclosure are not limited to the effects mentioned above, and other effects not mentioned are able to be clearly understood by those skilled in the art in the technical field to which the present disclosure belongs from a description below.

BEST MODE

Figure 1:
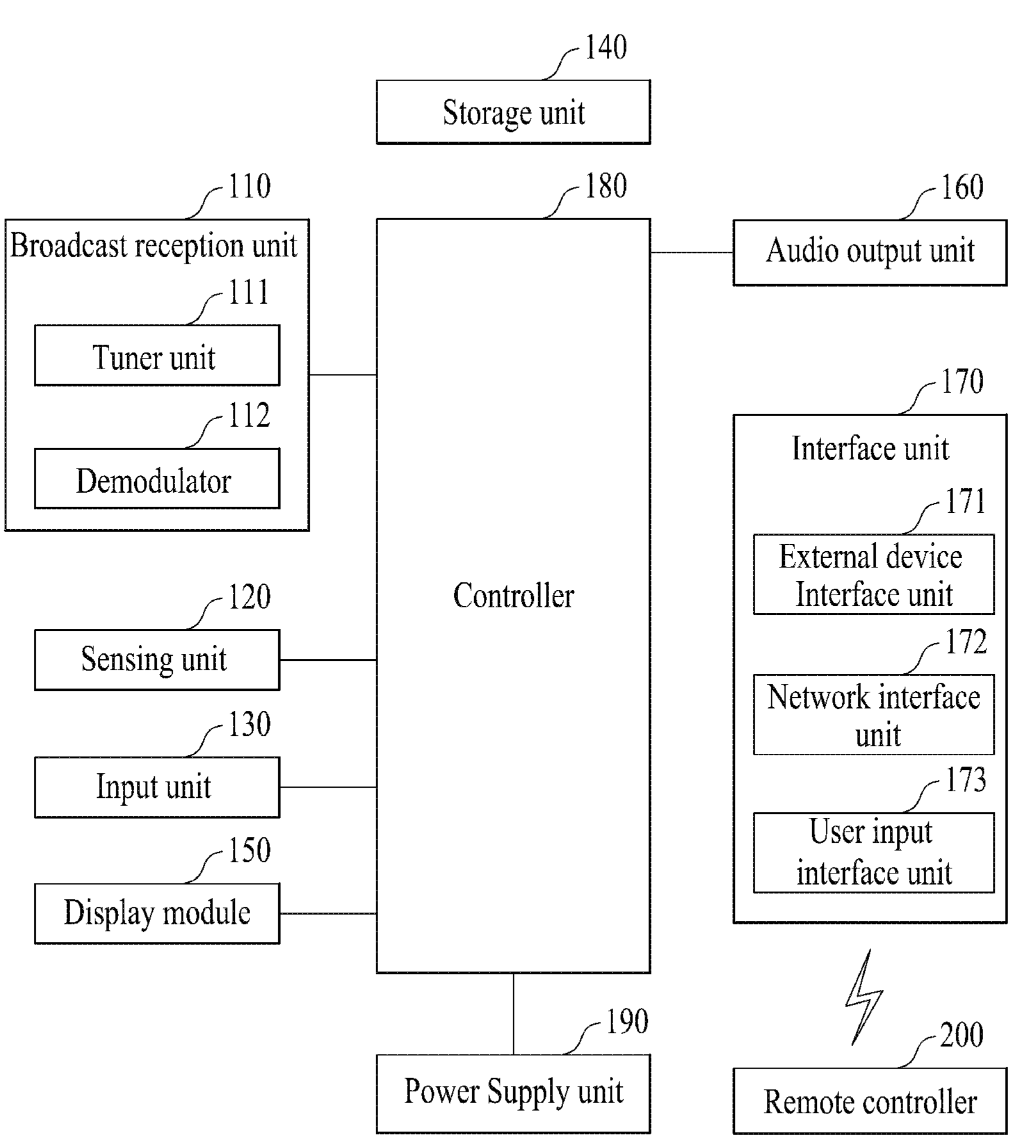
FIG. 1 is a block diagram illustrating constituent elements of a display device according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

On the other hand, the image display device described herein is, for example, an intelligent image display device implemented by adding a computer support function to a broadcast reception function, and further includes an Internet function or the like while sufficiently performing the broadcast reception function, so that the image display device may have user-friendly interfaces such as a handwriting input device, a touchscreen, or a spatial remote controller. Further, the image display device can support a wired or wireless Internet function by connecting to the Internet and a computer device, thereby performing e-mailing, web browsing, banking, or gaming. To implement these functions, the image display device may operate based on a standard general-purpose Operating System (OS).

Accordingly, the image display device according to the present disclosure is designed in a manner that various applications can be easily added to or deleted from a general-purpose OS kernel so that the image display device can perform various user-friendly functions. The image display device may be, for example, a network TV, a Hybrid broadcast broadband TV (HBBTV), a smart TV, etc. The image display device is applicable to a smartphone as needed.

FIG. 1 is a block diagram illustrating constituent elements of a display device 100 according to an embodiment of the present disclosure.

Referring to FIG. 1, the display device 100 may include a broadcast reception unit 110, an external device interface unit 171, a network interface unit 172, a storage unit 140, a user input interface unit 173, an input unit 130, a controller 180, a display 150, an audio output unit 160, and/or a power-supply unit 190.

The broadcast reception unit 110 may include a tuner unit 111 and a demodulator 112.

Although not shown in the drawings, the display device 100 may include only the external device interface unit 171 and the network interface unit 172 from among the broadcast reception unit 110, the external device interface unit 171, and the network interface unit 172. That is, the display device 100 may not include the broadcast reception unit 110.

The tuner unit 111 may select a broadcast signal corresponding to either a user-selected channel or all prestored channels from among broadcast signals received through an antenna (not shown) or a cable (not shown). The tuner unit 111 may convert the selected broadcast signal into an intermediate frequency (IF) signal or a baseband image or a voice signal.

For example, when the selected broadcast signal is a digital broadcast signal, the tuner unit 111 may convert the selected broadcast signal into a digital IF (DIF) signal. When the selected broadcast signal is an analog broadcast signal, the tuner unit 111 may convert the selected broadcast signal into an analog baseband image or a voice signal (CVBS/SIF). That is, the tuner unit 111 may process the digital broadcast signal or the analog broadcast signal. The analog baseband image or the voice signal (CVBS/SIF) output from the tuner unit 111 may be directly input to the controller 180.

The tuner unit 111 may sequentially select broadcasting signals of all broadcasting channels stored through a channel memory function from among the received broadcast signals, and may convert the selected broadcast signal into an intermediate frequency (IF) signal or a baseband image or a voice signal.

The tuner unit 111 may include a plurality of tuners to receive broadcast signals of the plurality of channels. Alternatively, a single tuner for simultaneously receiving broadcast signals of the plurality of channels is also possible.

The demodulator 112 may receive the digital IF signal (DIF) converted by the tuner unit 111, and may thus perform demodulation of the received signal. The demodulator 112 may perform demodulation and channel decoding, and may output a stream signal (TS). The stream signal may be a signal formed by multiplexing an image signal, a voice signal, or a data signal.

The stream signal (TS) output from the demodulator 112 may be input tio the controller 180. The controller 180 may perform demultiplexing, image/audio signal processing, etc., may output an image through the display 150, and may output a voice through the audio output unit 160.

The sensing unit 120 may sense a change in the display device 100 or may sense an external change. For example, the sensing unit 120 may include a proximity sensor, an illumination sensor, a touch sensor, an infrared (IR) sensor, an ultrasonic sensor, an optical sensor (e.g., a camera), a voice sensor (e.g., a microphone), a battery gauge, environmental sensors (e.g., hygrometer, a thermometer, etc.).

The controller 180 may check a state of the display device 100 based on information collected by the sensing unit 120, may notify the user of a problem, or may control the display device 100 to be kept in the best state.

In addition, it is possible to provide an optimal viewing environment by differently controlling the content, image quality, size, etc. of the image provided to the display module 180 depending on the viewer, ambient illuminance, etc. sensed by the sensing unit. As the smart TV has evolved, the number of functions mounted in the display device increases, and the number of the sensing units 20 also increases together with the increasing functions.

The input unit 130 may be provided at one side of a main body of the display device 100. For example, the input unit 130 may include a touch pad, a physical button, and the like. The input unit 130 may receive various user commands related to the operation of the display device 100, and may transmit a control signal corresponding to the input command to the controller 180.

Recently, as a bezel of the display device 100 decreases in size, the number of display devices 100 each including a minimum number of input unit 130 formed in a physical button exposed to the outside is rapidly increasing. Instead, a minimum number of physical buttons may be provided on the back or side surface of the display device 100. The display device may receive a user input through the remote controller 200 through a touchpad or a user input interface unit 173 to be described later.

The storage unit 140 may store a program for processing and controlling each signal used in the controller 180, and may store a signal-processed image, a voice, or a data signal. For example, the storage unit 140 may store application programs designed for the purpose of performing various tasks that can be processed by the controller 180, and may selectively provide some of the stored application programs upon request of the controller 180.

The program stored in the storage unit 140 is not specifically limited to being executed by the controller 180. The storage unit 140 may perform a function for temporarily storing an image, a voice, or a data signal received from an external device through the external device interface unit 171. The storage unit 140 may store information about a predetermined broadcast channel through a channel memory function such as a channel map.

Although the storage unit 140 of FIG. 1 is provided separately from the controller 180, the scope of the present disclosure is not limited thereto, and the storage unit 140 may also be included in the controller 180 as needed.

The storage unit 140 may include at least one of a volatile memory (e.g., DRAM, SRAM, SDRAM, etc.) and a non-volatile memory (e.g., flash memory, hard disk drive (HDD), solid state drive (SSD), etc.).

The display 150 may generate a drive signal by converting an image signal, a data signal, an OSD signal, a control signal processed by the controller 180, or by converting an image signal, a data signal, a control signal, etc. received from the interface unit 171. The display 150 may include a display panel 181 having a plurality of pixels.

A plurality of pixels included in the display panel may include RGB sub-pixels. Alternatively, a plurality of pixels included in the display panel may include sub-pixels of RGBW. The display 150 may convert the image signal, the data signal, the OSD signal, the control signal, etc. processed by the controller 180 to generate a drive signal for the plurality of pixels.

The display 150 may be implemented as a plasma display panel (PDP), a liquid crystal display (LCD), an organic light emitting diode (OLED), a flexible display, etc. In addition, the display 150 may also be implemented as a three-dimensional (3D) display. The three-dimensional (3D) display 150 may be classified into a glassless-type 3D display and a glasses-type 3D display.

The display device may include a display module that occupies most parts of the front surface, and a case that covers the back and side surfaces of the display module and packages the display module.

Recently, the display device 100 has evolved from a flat-screen display to a curved-screen display. In order to implement the curved screen, the display device 100 may use a display module 150 that can be bent or curved, such as a light emitting diode (LED) or an organic light emitting diode (OLED), etc.

Conventionally, the LCD has difficulty in self-emitting light, so that the conventional LCD has been designed to receive light through a backlight unit. The backlight unit is a device for uniformly supplying light received from a light source to a liquid crystal located on the front surface of the display device. As the backlight becomes thinner, a thin LCD can be implemented. However, it is actually difficult for the backlight unit to be implemented as a curved structure formed of a flexible material. Although the backlight unit is implemented as a curved shape, it is difficult for light to be uniformly applied to the liquid crystal, thereby changing brightness of the screen.

On the other hand, the LED or the OLED is designed in a manner that each of constituent elements constructing the pixels can self-emit light without using the backlight unit, so that the LED or the OLED can be implemented as a curved shape without any problems. In addition, since each element can perform self-emission of light, brightness of each element is not affected by a change in the positional relationship between the element and adjacent elements, so that a curved display module 150 can be implemented as an LED or OLED.

OLED (Organic Light Emitting Diode) panels appeared in earnest in mid-2010 and are rapidly replacing LCDs in the small- and medium-sized display market. The OLED is a display made using the self-emission characteristics in which OLED emits light when a current flows in a fluorescent organic compound. Since the response speed of the OLED is faster than that of the LCD, there is little afterimage when moving images are implemented.

OLEDs may be used as a light-emitting display product. In this case, the light-emitting display device may use three fluorescent organic compounds (such as red, green, and blue) each having a self-emitting function, and may use the self-emitting phenomenon in which positive(+)-charged particles and electrons injected from a cathode and anode are combined with each other within the organic material, so that a backlight unit causing degradation of color sense need not be used.

The LED panel is implemented by technology for using only one LED element as one pixel, and has a smaller LED element compared to the prior art, so that a curved display module 150 can be implemented. Whereas the conventional device referred to as an LED TV can use the LED as a light source of the backlight unit for supplying light to the LCD, it is impossible for the LED of the conventional device to constitute a screen.

The display module may include a display panel, a coupling magnet located on the rear surface of the display panel, a first power-supply unit, and a first signal module.

The display panel may include a plurality of pixels (R, G, B). The plurality of pixels (R, G, B) may be formed in each region where a plurality of data lines and a plurality of gate lines cross each other. The plurality of pixels (R, G, B) may be arranged in a matrix.

For example, the plurality of pixels (R, G, B) may include a red (R) sub-pixel, a green (G) sub-pixel, and a blue (B) sub-pixel. The plurality of pixels (R, G, B) may further include white (W) sub-pixel(s).

In the display module 150, one side where an image is displayed may be referred to as a front side or a front surface. When the display module 150 displays an image, one side where no image is observed may be referred to as a rear side or a rear surface.

Meanwhile, the display 150 may be implemented as a touchscreen, so that the display 150 can also be used as an input device in addition to an output device.

The audio output unit 160 may receive a voice-processed signal from the controller 180, and may output the received signal as a voice signal.

The interface unit 170 may serve as a path of connection to various kinds of external devices connected to the display device 100. The interface unit may include not only a wired method for transmitting/receiving data through a cable, but also a wireless method using the antenna.

The interface unit 170 may include at least one of a wired/wireless headset port, an external charger port, a wired/wireless data port, a memory card port, a port connected to a device having an identification module, an audio input/output (I/O) port, a video I/O port, and an earphone port.

As an example of a wireless method, the above-described broadcast reception unit 110 may be used. The broadcast reception unit 110 may be configured to use a broadcast signal, a mobile communication short-range communication signal, a wireless Internet signal, and the like.

The external device interface unit 171 may transmit or receive data to and from a connected external device. To this end, the external device interface unit 171 may include an A/V input/output (I/O) unit (not shown).

The external device interface unit 171 may be wired or wirelessly connected to an external device such as a digital versatile disc (DVD) player, a Blu-ray player, a game console, a camera, a camcorder, a computer (laptop), a set-top box, or the like, and may perform an input/output (I/O) operation with the external device.

In addition, the external device interface unit 171 may establish a communication network with various remote controllers 200, may receive a control signal related to operation of the display device 100 from the remote controller 200, or may transmit data related to operation of the display device 100 to the remote controller 200.

The external device interface unit 171 may include a wireless communication unit (not shown) for short-range wireless communication with other electronic devices. Through the wireless communication unit (not shown), the external device interface unit 171 may exchange data with an adjacent mobile terminal. In particular, the external device interface unit 171 may receive device information, application information, an application image, and the like from the mobile terminal in a mirroring mode.

The network interface unit 172 may provide an interface for connecting the display device 100 to a wired/wireless network including the Internet network. For example, the network interface unit 172 may receive content or data provided by the Internet, a content provider, or a network administrator through a network. The network interface unit 172 may include a communication module (not shown) for connection with the wired/wireless network.

The external device interface unit 171 and/or the network interface unit 172 may include a communication module for short-range communication such as Wi-Fi, Bluetooth, Bluetooth low energy (BLE), ZigBee, Near Field Communication (NFC), and a communication module for cellular communication such as Long-Term Evolution (LTE), LTE-A (LTE Advanced), Code Division Multiple Access (CDMA), WCDMA (wideband CDMA), UMTS (universal mobile telecommunications system), WiBro (Wireless Broadband), etc.

The user input interface unit 173 may transmit user input signals to the controller 180, or may transmit signals received from the controller 180 to the user. For example, the user input interface unit 173 may transmit or receive user input signals (such as a power-on/off signal, a channel selection signal, and a screen setting signal) to and from the remote controller 200, may transmit user input signals received through a local key (not shown) such as a power key, a channel key, a volume key, and a setting key to the controller 180, may transmit a user input signal received by a sensor unit (not shown) for sensing a user gesture to the controller 180, or may transmit a signal received from the controller 180 to the sensor unit.

The controller 180 may include at least one processor, and may control the overall operation of the display device 100 using the processor included therein. Here, the processor may be a general processor such as a CPU. Of course, the processor may be a dedicated device such as an ASIC, or other hardware-based processor.

The controller 180 may demultiplex the stream received through the tuner unit 111, the demodulator 112, the external device interface unit 171, or the network interface 172, and may process the demultiplexed signals to generate and output a signal for image or voice output.

The image signal processed by the controller 180 may be input to the display 150 and displayed as an image corresponding to the corresponding image signal. In addition, the image signal processed by the controller 180 may be input to the external output device through the external device interface unit 171.

The voice (or audio) signal processed by the controller 180 may be audibly output to the audio output unit 160. In addition, the voice signal processed by the controller 180 may be input to the external output device through the external device interface unit 171. Although not shown in FIG. 2, the controller 180 may include a demultiplexer, an image processor, and the like, and a detailed description thereof will hereinafter be described with reference to FIG. 3.

In addition, the controller 180 may control the overall operation of the display device 100. For example, the controller 180 may control the tuner unit 111 to select a broadcast program corresponding to either a user-selected channel or a prestored channel.

In addition, the controller 180 may control the display device 100 by a user command or an internal program received through the user input interface unit 173. The controller 180 may control the display 150 to display an image. In this case, the image displayed on the display 150 may be a still image or a moving image, and may be a 2D image or a 3D image.

On the other hand, the controller 180 may display a predetermined 2D object in the image displayed on the display 150. For example, the object may be at least one of a connected web screen (newspaper, magazine, etc.), electronic program guide (EPG), various menus, widgets, icons, still images, moving images, and text.

Meanwhile, the controller 180 may modulate and/or demodulate the signal using an amplitude shift keying (ASK) scheme. Here, the ASK scheme may refer to a method for modulating a signal by differentiating the amplitude of a carrier wave according to data values or for restoring an analog signal to a digital data value according to the amplitude of the carrier wave.

For example, the controller 180 may modulate an image signal using the ASK scheme, and may transmit the modulated signal through a wireless communication module.

For example, the controller 180 may demodulate and process the image signal received through the wireless communication module using the ASK scheme.

Accordingly, the display device 100 may simply transmit and receive signals to and from other image display devices arranged adjacent to each other without using either a unique identifier such as a Media Access Control (MAC) address or a complex communication protocol such as TCP/IP.

On the other hand, the display device 100 may further include a photographing unit (not shown). The photographing unit may photograph a user. The photographing unit may be implemented as one camera, but is not limited thereto, and may be implemented by a plurality of cameras. On the other hand, the photographing unit may be embedded in the display device 100 or may be separately arranged on the display 150. The image information photographed by the photographing unit may be input to the controller 180.

The controller 180 may recognize the position of the user based on the image photographed by the photographing unit. For example, the controller 180 may recognize a distance (z-axis coordinates) between the user and the display device 100. In addition, the controller 180 may recognize the X-axis coordinate and the Y-axis coordinate within the display 150 corresponding to the user position.

The controller 180 may sense a user gesture based on an image photographed by the photographing unit, each of signals detected by the sensor unit, or a combination thereof.

The power-supply unit 190 may supply corresponding power to the display device 100. In particular, the controller 180 may be implemented as a System on Chip (SoC), a display 150 for displaying an image, and an audio output unit 160 for audio output.

Specifically, the power-supply unit 190 may include a converter (not shown) for converting AC power into DC power, and a DC/DC converter (not shown) for converting the level of DC power.

On the other hand, the power-supply unit 190 may receive power from the external power source, and may distribute the received power to the respective components. The power-supply unit 190 may be directly connected to the external power source to supply AC power, and may include a battery capable of being charged with electricity.

In the former case, the power-supply unit 190 may be used by connecting to a wired cable, and it is difficult for the power-supply unit 190 to move from one place to another place, and the movement range of the power-supply unit 190 is limited. In the latter case, the power-supply unit 190 can move from one place to another place, but the weight and volume of the power-supply unit 190 may increase as much as the weight and volume of the battery. In addition, for charging, the power-supply unit 190 should be directly connected to a power cable for a predetermined period of time or should be coupled to a charging cradle (not shown) for power supply.

The charging cradle may be connected to the display device through a terminal exposed to the outside. Alternatively, if the power-supply unit 190 approaches the charging cradle using a wireless interface, a built-in battery of the power-supply unit 190 may also be charged with electricity.

The remote controller 200 may transmit a user input to the user input interface unit 173. To this end, the remote controller 200 may use Bluetooth, Radio Frequency (RF) communication, infrared (IR) communication, Ultra-Wideband (UWB), ZigBee, or the like. In addition, the remote controller 200 may receive the image, voice, or data signal output from the user input interface unit 173, and may display or audibly output the received image, voice, or data signal.

On the other hand, the above-described display device 100 may be a fixed or mobile digital broadcast receiver capable of receiving digital broadcast signals.

Meanwhile, the block diagram of the display device 100 shown in FIG. 1 is disclosed for only for illustrative purposes for one embodiment of the present disclosure, and the respective components of the display device 100 shown in FIG. 1 can be integrated, added or omitted according to the specifications of the digital device 100 which is actually implemented.

That is, if necessary, two or more components may be combined into one component, or one component may be subdivided into two or more components. In addition, the functions performed in each block are intended to explain the embodiment of the present disclosure, and the specific operation or device does not limit the scope of the present disclosure.

The time shift technology of the related art generally performs recording and playback constantly over time. However, in this case, when there is a problem with watching TV due to external noise (such as phone calls, conversations, external noise such as the sound of an airplane, etc.), it is cumbersome to return to a corresponding interval.

In particular, since it is difficult to accurately find the time and interval (10 seconds, 30 seconds, 1 minute, etc.) that was missed, it is intended to propose a method of storing a time and interval where noise occurred and playing it again.

Figure 2:
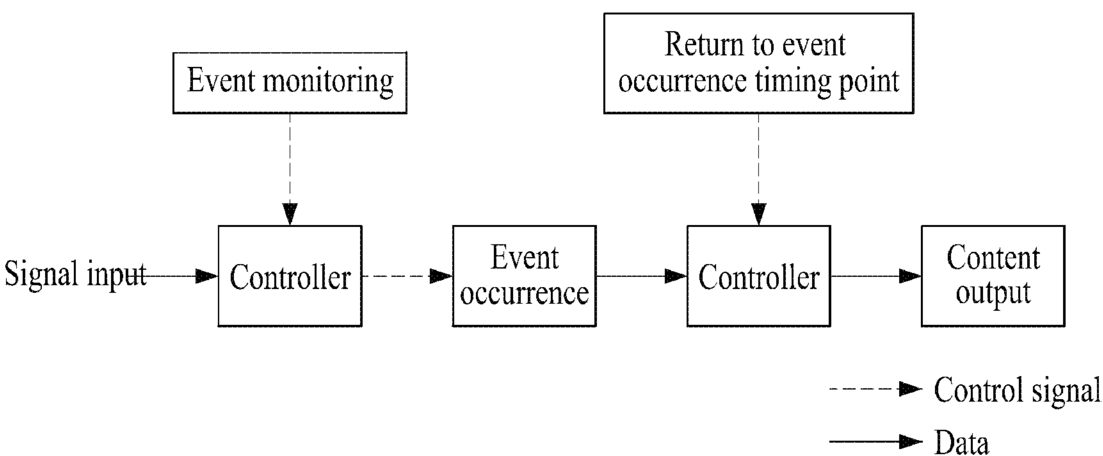
FIG. 2 is a diagram illustrating an operation of a display device according to an embodiment of the present disclosure.

FIG. 2 is a diagram illustrating an operation of a display device according to an embodiment of the present disclosure. Hereinafter, a description redundant with the foregoing description will be omitted.

Referring to FIG. 2, a controller (hereinafter, an operation performed by the controller will be described as performed by a display device for convenience of description) may receive a signal input. That is, the display device may receive data from the outside in order to output a content. In this case, the display device may receive to output a broadcast content through a broadcast reception unit or may receive to output a content through an interface unit. In this case, when an event occurs while the broadcast content received through the broadcast reception unit is being outputted, the display device may need to store the broadcast content itself. This corresponds to a case in which the broadcast content received through the broadcast reception unit does not provide a replay function. This will be described in detail with reference to FIG. 8.

According to an embodiment, the display device may constantly monitor an event. This may be turned on/off through a setting menu. According to an embodiment, the display device may detect an event occurrence in a state in which a content is being outputted. In this case, the display device may store a timing point at which the event has occurred. For example, the display device may record the event occurrence at the timing point of 22:04 of a first content in a memory. Hereinafter, an embodiment in which the display device detects an event occurrence will be described in detail with reference to FIGS. 3 to 6.

Thereafter, the display device may return to the event occurrence timing point based on a control signal. In an embodiment, the display device may return to a most recently occurring event timing point based on the control signal. In more detail, when the most recently occurring event timing point is 17:45 of a second content, the display device may directly play the 17:45 of the second content based on the control signal. Accordingly, a user may directly play the content that has not been viewed due to sudden noise.

On the other hand, in another embodiment, the display device may output an event occurrence list, select a first event from the event occurrence list, and then output a content. This will be described in detail with reference to FIG. 7.

A display device according to an embodiment of the present disclosure may distinguish a sound of an outputted content and a noise generated from the outside from each other. This is because an output waveform of the sound of the content outputted from the display device is known. Accordingly, the display device may distinguish a noise received from an external device, a noise received from a microphone included in the display device itself, and an audio output generated from a content.

That is, irrespective of a volume of a content being outputted from the display device, the display device may determine a sound of a first decibel or higher as a noise other than an output sound of the content.

This will be described in detail through the following drawings.

Figure 3:
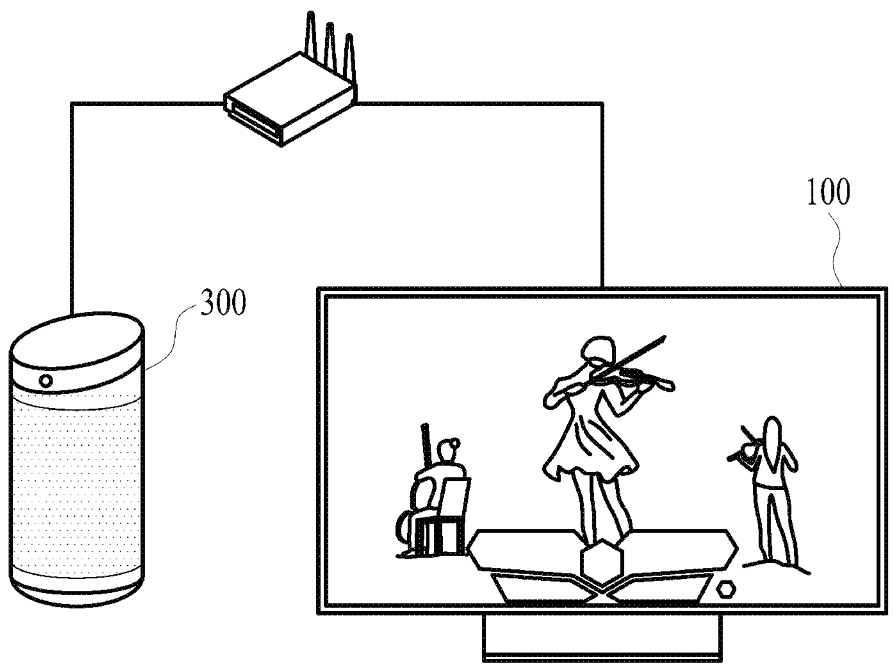
FIG. 3 is a diagram illustrating an embodiment of detecting noise by a display device according to an embodiment of the present disclosure.

FIG. 3 is a diagram illustrating an embodiment in which a display device detects noise according to an embodiment of the present disclosure. Hereinafter, a description redundant with the foregoing description redundant with the foregoing description will be omitted.

Referring to FIG. 3, a display device 100 may detect noise through an AI speaker 300 while outputting a content.

Here, the noise is characterized in having a first decibel (dB) or higher. In addition, the first decibel may be determined when a manufacturer delivers the display device 100 or may be determined by a user setting.

In addition, the display device 100 and the AI speaker 300 may use the same Wi-Fi through a wireless router or the like. Accordingly, the display device 100 may detect noise through the AI speaker 300.

When the display device 100 detects noise, the display device 100 may record a noise occurrence timing point of the content being outputted. For example, when the display device 100 receives a noise occurrence from the AI speaker 300 at a play timing point 26:33 of the content, the display device 100 may record the timing point 26:33 of the content. Thereafter, the display device 100 may play the timing point 26:33 of the content based on a control signal for directly moving to the noise occurrence timing point or a control signal for outputting an event occurrence list.

Through this, when external noise above a specific decibel (dB) occurs, a trigger of that moment is stored to easily return thereto.

Figure 4:
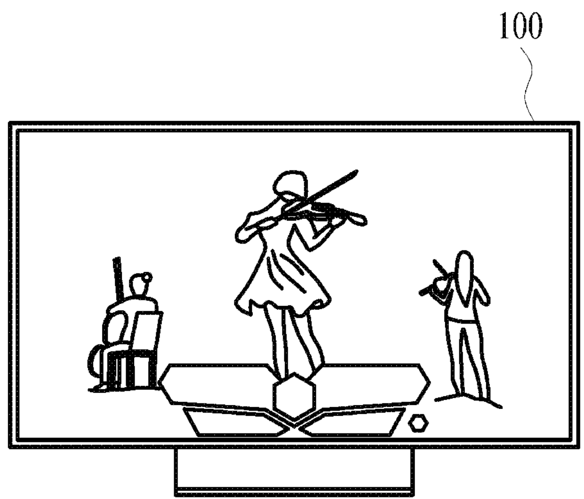
FIG. 4 is a diagram illustrating an embodiment of detecting noise by a display device according to another embodiment of the present disclosure.
Figure 4:
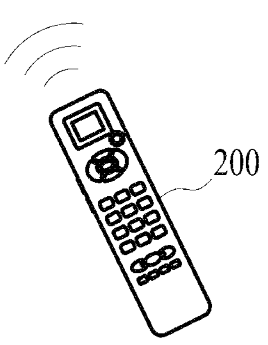

FIG. 4 is a diagram illustrating an embodiment in which a display device detects noise according to another embodiment of the present disclosure. Hereinafter, a description redundant with the foregoing description will be omitted.

In an embodiment of the present disclosure, an external device is a remote controller 200 including a microphone. That is, the remote controller 200 recently commercialized may include a microphone to provide voice recognition. In this case, in an embodiment, a display device 100 may detect noise using the microphone in the remote controller 200. In this case, the remote controller 200 and the display device 100 may transceive information with each other using Wi-Fi, Bluetooth, or the like.

Referring to FIG. 4, the display device 100 may detect noise through the microphone. Thereafter, when the detected noise is greater than or equal to a first value, the display device 100 may record a noise occurrence timing point of a content being outputted.

Thereafter, the display device 100 may play the content at the noise occurrence timing point detected through the microphone based on a control signal for moving to the noise occurrence timing point.

Through this, when external noise greater than or equal to a specific decibel (dB) occurs, a trigger of that moment is stored to easily return thereto.

Figure 5:
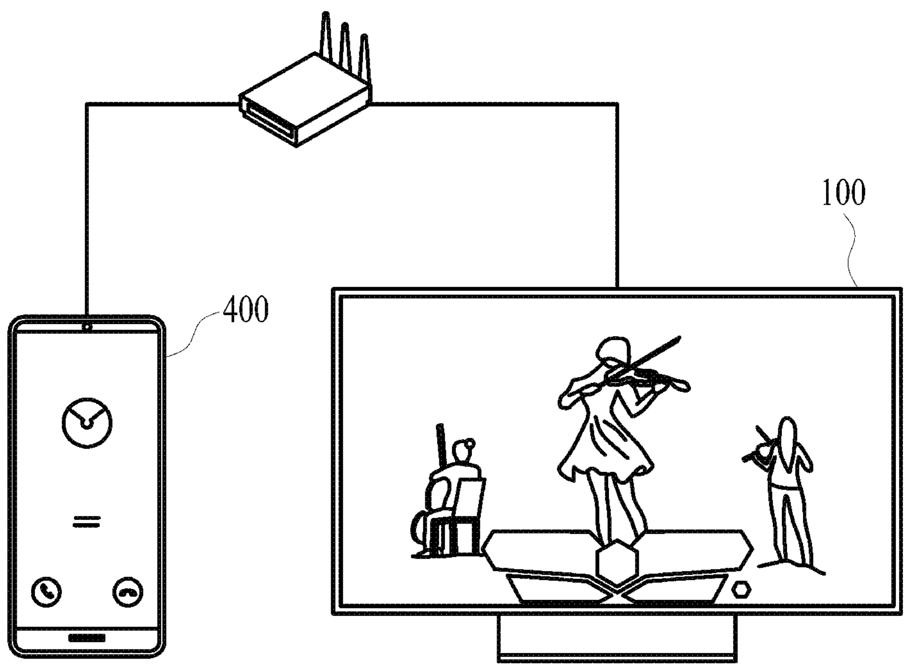
FIG. 5 is a diagram illustrating an embodiment of detecting an event by a display device according to an embodiment of the present disclosure.

FIG. 5 is a diagram illustrating an embodiment in which a display device detects an event according to another embodiment of the present disclosure. Hereinafter, a description redundant with the foregoing description will be omitted.

In an embodiment of the present disclosure, an external device is characterized in being a mobile terminal 400. Here, the mobile terminal 400 is characterized in being a user device connected to the display device 100 through the same Wi-Fi or the like. Also, in FIG. 5, one mobile terminal 400 is connected to the display device 100, but of course, a plurality of mobile terminals 400 may be connected to the display device 100. In this case, the display device 100 may manage a plurality of the mobile terminals by giving an ID of the mobile terminal.

Referring to FIG. 5, when the mobile terminal 400 is in use, the display device 100 may record an event occurrence timing point of a content being outputted.

More specifically, a user often uses the mobile terminal 400 while viewing a content being outputted from the display device 100. For example, a phone call or a text is received by the mobile terminal 400, or a user surfs the web.

That is, although the content is being played in the display device 100, the user cannot fully concentrate on the content being played because the user uses the mobile terminal 400. In this case, the display device 100 may record the case in which the mobile terminal 400 is in use as an event occurrence timing point and play it again as receiving a control signal later.

When a call is transmitted or received by the mobile terminal 400, the display device 100 may receive information, which indicates that the call is transmitted or received, from the mobile terminal 400. Accordingly, the display device 100 may record a content time of the timing point at which the call starts.

Also, when a user starts to touch the mobile terminal 400, the display device 100 may receive touch information from the mobile terminal 400. Thus, the display device 100 may record a content time of the timing point when the user uses the mobile terminal 400.

In another embodiment, only when a user inputs a touch signal to the mobile terminal 400 and then inputs a touch signal again even after elapse of a first time, the display device 100 may determine it as an event occurrence. That is, when the user activates the mobile terminal 400 simply to view a clock, the display device 100 may not determine it as an event occurrence. However, when the user operates the mobile terminal 400 for a first time (e.g., 5 minutes) or more, the display device 100 may determine that the user fails to concentrate on a content being outputted and record an event occurrence timing point.

Thereafter, the display device 100 may play a content corresponding to the event occurrence timing point based on a control signal for returning to the event occurrence timing point.

Figure 6:
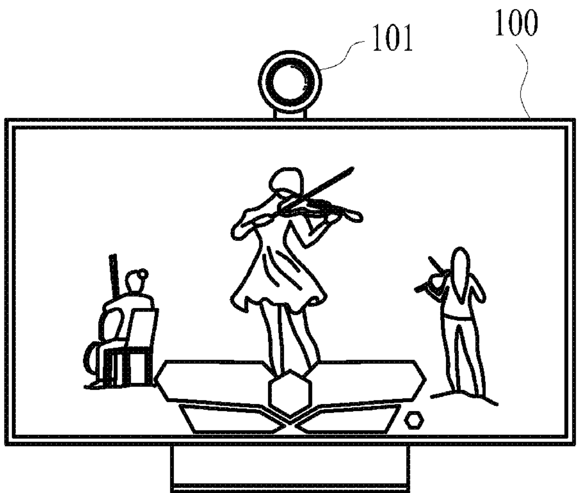
FIG. 6 is a diagram illustrating an embodiment of detecting an event by a display device according to an embodiment of the present disclosure.

FIG. 6 is a diagram illustrating an embodiment in which a display device detects an event according to an embodiment of the present disclosure. Hereinafter, a description redundant with the foregoing description will be omitted.

Referring to FIG. 6, a display device 100 may further include a camera 101. Here, the camera 101 may be attached to a front surface of the display device 100 to capture an image or video.

The display device 100 may detect a user through the camera 101. In an embodiment of the present disclosure, the display device 100 may determine a case in which the user is not detected through the camera 101 as an event occurrence.

That is, in various cases, the user leaves a seat while watching a content that is being outputted from the display device 100. In this case, the display device 100 may detect a state in which the user has left the seat, and determine the state in which the user has left the seat as an event occurrence. Accordingly, the display device 100 may record a timing point at which the user has left the seat as an event occurrence timing point.

In addition, when the state in which the user has left the seat continues for a first time (e.g., 10 minutes) or more, the display device 100 may determine it as an event occurrence. That is, the user may go to the bathroom while viewing a content through the display device 100. In this case, when the viewed content is not paused or cannot be paused, the user misses a part of the content. To compensate for this, when the state in which the user has left the seat continues for the first time or more, the display device 100 may determine it as an event occurrence and record a first timing point of the content, which is an event occurrence timing point.

Thereafter, the display device 100 may play the content corresponding to the event occurrence timing point based on a control signal for returning to the event occurrence timing point.

Figure 7:
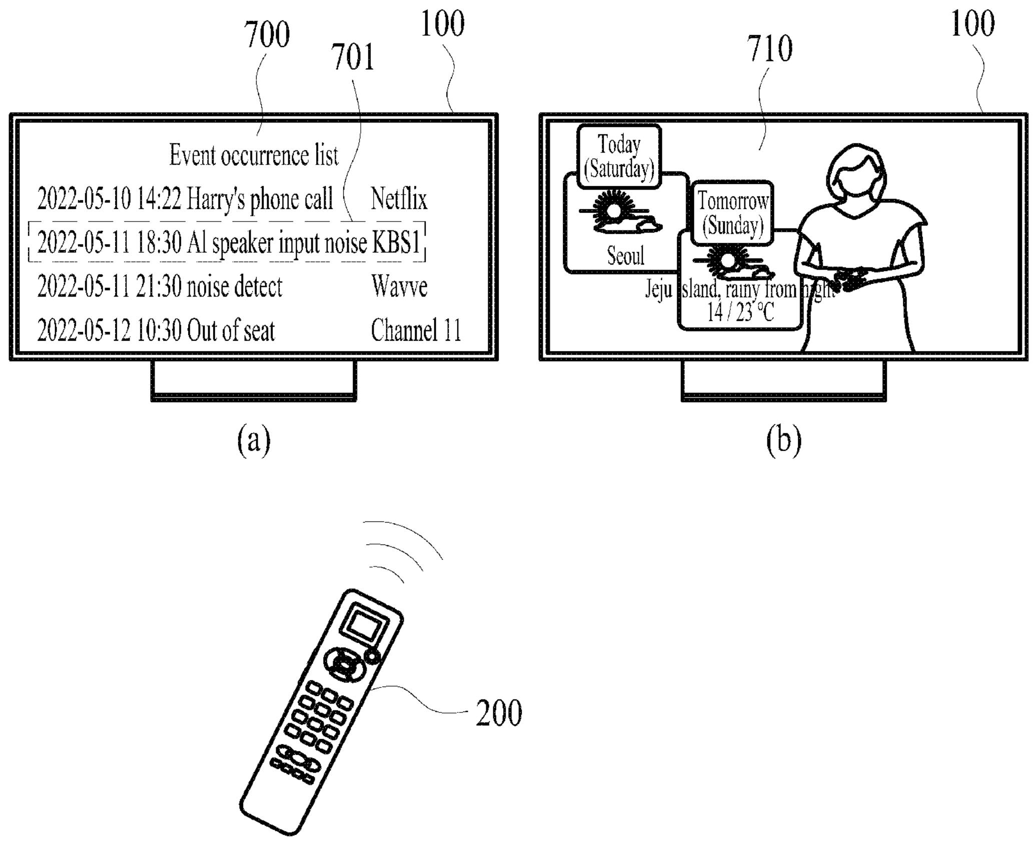
FIG. 7 is a diagram illustrating an embodiment of outputting an event occurrence list by a display device according to an embodiment of the present disclosure.

FIG. 7 is a diagram illustrating an embodiment in which a display device outputs an event occurrence list, according to an embodiment of the present disclosure. Hereinafter, a description redundant with the foregoing description will be omitted.

Referring to FIG. 7 (*a*), a display device 100 may receive a first control signal for outputting an event occurrence list. Here, the first control signal may correspond to a signal for selecting a physical button (e.g., an event occurrence list output button) included in a remote controller 200 or a control signal for selecting an icon (not shown) in the display device 100.

More specifically, in response to receiving the first control signal, the display device 100 may output an event occurrence list 700. Here, the event occurrence list may include a first timing point and a first content information that is being outputted.

In particular, the event occurrence list may include an event occurrence timing point recorded by the display device 100 according to the above-described embodiment. For example, the display device 100 may record that a phone call is made from Harry's phone (a mobile terminal registered in the display device 100) at 14:22 on May 10, 2022. In addition, the display device 100 may include 'the content viewed at this timing point that is the content-A of Netflix and is the first timing point' in the event occurrence list.

That is, the event occurrence list may include at least one event occurrence timing point and content information at the event occurrence timing point.

Referring to FIG. 7 (*b*), the display device 100 may play a first timing point of a content 710 based on a second control signal for selecting a first event 701 included in the event occurrence list. Here, like the first signal, the second signal may correspond to a signal for selecting a physical button (e.g., a play button) included in the remote controller 200 or a control signal for selecting an icon (not shown) in the display device 100.

More specifically, a user may select the first event 701 from the event occurrence list. Here, the first event 701 may be, for example, an event that occurred at 18:30 on May 11, 2022, and may be characterized in being noise detected through an AI speaker among external devices. For example, when the noise occurs, the user may be watching a first timing point 22:10 of the content 710 of a KBS1 channel through the display device 100. Accordingly, the display device 100 may play the first timing point of the content 710 based on the second control signal for selecting the first event 701.

Figure 8:
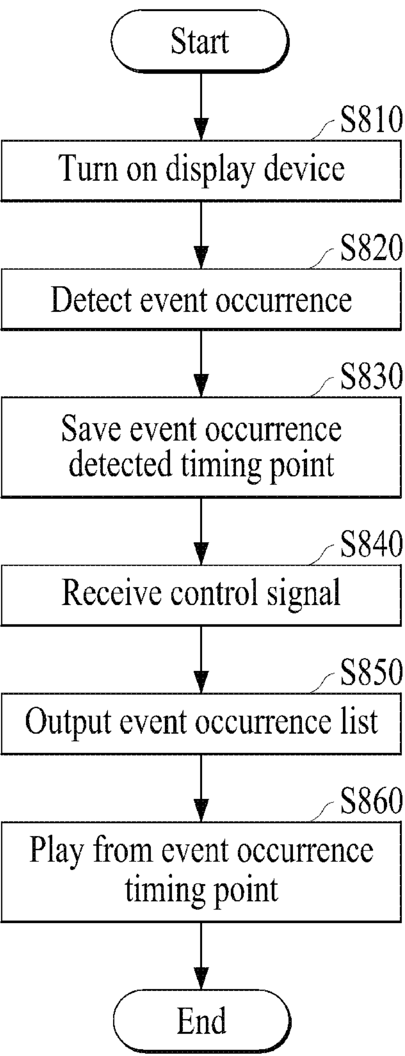
FIG. 8 is a flowchart illustrating a method of controlling a display device according to an embodiment of the present disclosure.

FIG. 8 is a flowchart illustrating a method of controlling a display device according to an embodiment of the present disclosure. Hereinafter, a description redundant with the foregoing description will be omitted.

In a step S810, a display device may be power on or turned on. Thereafter, the display device may start event monitoring. According to an embodiment, the display device may set whether to always monitor an event. For example, a user may set whether to always turn on/off an event detection through a setting menu of the display device.

In a step S820, the display device may detect a first event occurrence while a first content is being outputted. Here, the display device may detect noise through an external device (such as an AI speaker, a remote controller including a microphone, etc.). In addition, the display device may determine a case in which an external device is in use as a case in which an event occurs. In addition, the display device may determine a case in which a user is not detected through a camera as a case in which an event occurs.

In an embodiment, when the first content is a content received through a broadcast reception unit, the display device may store the content in a memory as a first event is detected.

More specifically, the display device may output a content through a display. In this case, the outputted content may correspond to a content received through the broadcast reception unit or a content received through an interface unit.

In the case of the content received through the interface unit, the display device may play the content again from a first timing point through the interface unit in order to play the content. On the other hand, in the case of the content received through the broadcast reception unit, the display device must store the content in a memory in order to play the content. This is because the content received through the broadcast reception unit is not provided with a replay function unlike a content provided by a general OTT platform.

To this end, in an embodiment of the present disclosure, when a content being outputted is a content received through the broadcast reception unit, the display device may store the content in the memory in response to detecting an event occurrence. Here, the memory may include a general hard disk, an SSD disk, a USB drive, or the like.

In a step S830, the display device may store a first timing point at which the first event is detected. The steps S820 and S830 will be described with reference to the foregoing descriptions of FIGS. 3 to 6.

In a step S840, the display device may receive a first control signal. In an embodiment, it is characterized in that the first control signal is a physical button included in a remote controller. That is, the remote controller according to an embodiment of the present disclosure is characterized in including a physical button for outputting an event occurrence list.

In a step S850, the display device may output an event occurrence list in response to receiving the first control signal. Here, the event occurrence list may include the first timing point at which the event occurs and the content information.

In a step S860, the display device may play the first timing point of the first content based on a second control signal for selecting the first event included in the event occurrence list. The steps S840 to S860 will be described with reference to the foregoing description of FIG. 7.

The present disclosure may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller. The above exemplary embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

INDUSTRIAL APPLICABILITY

Since a display device and method of controlling the same according to an embodiment of the present disclosure may be repeatedly implemented, there is industrial applicability.

What is claimed is:

1. A display device, comprising:

a memory;

a communication interface configured to communicate with an external device;

a display outputting a content; and a controller configured to control the communication interface and the display, wherein the controller is further configured to detect an occurrence of an event in a state of outputting the content, store a timing point of detecting the event, output an event occurrence list in response to receiving a first control signal, and play a first timing point of a first content based on a second control signal for selecting a first event included in the event occurrence list, wherein the external device includes a mobile terminal, and wherein the event includes at least two touch signals input to the mobile terminal, one of the at least two touch signals following another of the at least two touch signals after a predetermined period of time.

2. The display device of claim 1, wherein the event further includes a noise greater than or equal to a first decibel.

3. The display device of claim 2, wherein the external device further includes an AI speaker and wherein the controller detects the noise through the AI speaker.

4. The display device of claim 2, wherein the external device further includes a remote controller including a microphone and wherein the controller detects the noise through the microphone.

5. The display device of claim 1, further comprising a camera, wherein the event further includes a case that a user is not detected through the camera.

6. The display device of claim 1, wherein the event occurrence list includes the first timing point and first content information.

7. The display device of claim 1, wherein based on receiving a third control signal, the controller plays a second timing point of a content related to a most recently occurring event.

8. The display device of claim 1, wherein the first control signal is a signal for selecting a physical button included in a remote controller.

9. The display device of claim 1, wherein based on the content being a content received through a broadcast reception interface, the controller stores the content in the memory in response detecting the event.

10. A method of controlling a display device, the method comprising:

communicating with a mobile terminal;

detecting an event in a state that a content is being outputted;

storing a timing point of detecting the event;

outputting an event occurrence list in response to receiving a first control signal; and playing a first timing point of a first content based on a second control signal for selecting a first event included in the event occurrence list, wherein the event includes at least two touch signals input to the mobile terminal, one of the at least two touch signals following another of the at least two touch signals after a predetermined period of time.

* * * * *